(12) United States Patent
Ogawa (10) Patent No.: US 9,471,058 B2
(45) Date of Patent: Oct. 18, 2016

(54) DATA ACQUISITION DEVICE FOR ACQUIRING CAUSE OF STOPPAGE OF DRIVE AXIS AND INFORMATION RELATING THERETO

(71) Applicant: FANUC Corporation, Yamanashi (JP)

(72) Inventor: Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 226 days.

(21) Appl. No.: 14/478,989

(22) Filed: Sep. 5, 2014

(65) Prior Publication Data

US 2015/0066434 A1 Mar. 5, 2015

(30) Foreign Application Priority Data

Sep. 5, 2013 (JP) ................. 2013-184190

(51) Int. Cl.
*G05B 23/02* (2006.01)
*G05B 19/4063* (2006.01)

(52) U.S. Cl.
CPC ....... *G05B 23/0208* (2013.01); *G05B 19/4063* (2013.01)

(58) Field of Classification Search
CPC .................................................. G05B 23/0208
USPC ........................................................ 702/187
See application file for complete search history.

(56) References Cited

U.S. PATENT DOCUMENTS

| 7,203,561 B2 * | 4/2007 | Sugihara | ................ G05B 15/02 700/110 |
| 8,010,302 B2 * | 8/2011 | Okita | .................... G05B 19/409 702/41 |
| 2003/0014699 A1 | 1/2003 | Kallela et al. | |

FOREIGN PATENT DOCUMENTS

| CN | 1405389 A | 3/2003 |
| CN | 1773407 A | 5/2006 |
| CN | 1811626 A | 8/2006 |
| JP | 2559273 B2 | 12/1996 |
| JP | 2005-118968 A | 5/2005 |
| JP | 2006-99284 A | 4/2006 |
| JP | 2010-092405 A | 4/2010 |
| JP | 2011-039708 A | 2/2011 |

* cited by examiner

*Primary Examiner* — Bryan Bui
(74) *Attorney, Agent, or Firm* — Hauptman Ham, LLP

(57) ABSTRACT

A data acquisition device includes an operational information acquiring part for acquiring operational data from a numerical control device, an active portion acquiring part for acquiring an active portion of a machining program from the numerical control device, a stopping cause acquiring part for acquiring stopping cause information representative of cause of stoppage when the drive axis is stopped, from the numerical control device, and storing part for storing the operational data, the active portion, and the stopping cause information, in association with time of their acquisition, respectively.

5 Claims, 7 Drawing Sheets

FIG. 3

DATA ACQUISITION DEVICE FOR ACQUIRING CAUSE OF STOPPAGE OF DRIVE AXIS AND INFORMATION RELATING THERETO

RELATED APPLICATIONS

The present application claims priority to Japanese Application Number 2013-184190, filed Sep. 5, 2013, the disclosure of which is hereby incorporated by reference herein in its entirety.

BACKGROUND OF THE INVENTION

1. Field of the Invention

The present invention relates to a data acquisition device used with a machine tool.

2. Description of the Related Art

In an at least a partially automated machining system using a machine tool controlled by a numerical control device, it is important to reduce time required to complete a series of steps, i.e., reduce cycle time, in order to improve productivity. Cycle time mainly consists of working time during which at least one drive axis of the machine tool is in operation, and stoppage time during which no drive axis is in operation. There is a correlation between the working time and machining accuracy: Machining accuracy generally tends to decrease, as the working time is shortened. Accordingly, it is necessary to reduce the stoppage time in order to reduce the cycle time.

Existing data acquisition devices are generally designed to acquire data representative of operational information of drive axes of the machine tool, and information on a machining program from the numerical control device. An operator can only ascertain the stoppage time of the drive axes, and information on the active portion of the program when the drive axes are in a stopped state. For this reason, it is necessary for the operator to attempt to reduce the stoppage time by guessing the cause of stoppage of the drive axes in order to adjust the machining program or parameters.

JP-A-2011-39708 discloses a control system for a machine tool designed to obtain a reference value of cycle time and its variance from actual sampling signals, and automatically detect irregularity by comparing the cycle time to complete the machining process with the reference value. JP-A-2011-39708 discloses acquiring a block number of the machining program simultaneously with the sampled information, so as to allow an operator to easily check the relationship between the sampled result and the machining program.

JP-A-2010-92405 discloses a numerically controlled machine tool designed to display a time chart of machining load during a machining process and a corresponding machining program on the same screen of a display device, so as to allow the machining program to be efficiently modified in accordance with magnitude of the machining load.

However, according to the existing data acquisition device, the cause of stoppage of drive axis has not been identified, and thus it is necessary to reduce the stoppage time of the drive axis through try-and-error, which requires intensive labor and/or enormous time. Accordingly, there is a need for a data acquisition device for providing an operator with useful information in order to efficiently reduce the stoppage time of the drive axis.

SUMMARY OF THE INVENTION

According to a first aspect of the present invention, a data acquisition device for acquiring, from a numerical control device of a machine tool for controlling a drive axis in accordance with a machining program and a machining condition, data including operational data representative of operational information of the drive axis, the data acquisition device comprising: an operational information acquiring part for acquiring the operational data from the numerical control device; an active portion acquiring part for acquiring an active portion of the machining program from the numerical control device; a stopping cause acquiring part for acquiring, from the numerical control device, stopping cause information representative of cause of stoppage when the drive axis is stopped; and a storing part for storing the operational data, the active portion, and the stopping cause information, in association with time of acquisition thereof, respectively, is provided.

According to a second aspect of the present invention, in the data acquisition device according to the first aspect, the operational data includes a move command to the drive axis.

According to a third aspect of the present invention, the data acquisition device according to the first or second aspect further comprises a display part for displaying the operational data, the active portion, and the stopping cause information in time series in the form of graph or table such that the operational data, the active portion, and the stopping cause information can be compared with one another.

According to a fourth aspect of the present invention, the data acquisition device according to any one of the first to third aspects further comprises: a stoppage time calculating part for calculating stoppage time for each cause of stoppage, based on the stopping cause information and the operational data; and a stoppage time display part for displaying the stoppage time for each cause of stoppage in the form of graph or table.

According to a fifth aspect of the present invention, the data acquisition device according to any one of the first to fourth aspects further comprises: a stoppage time calculating part for calculating stoppage time for each active portion, based on the stopping cause information, the operational data and the active portion; and a stoppage time display part for displaying the stoppage time for each active portion in the form of graph or table.

These and other objects, features and advantages of the present invention will become more apparent in light of the detailed description of exemplary embodiments thereof as illustrated by the drawings.

DETAILED DESCRIPTION OF THE INVENTION

Figure 1:
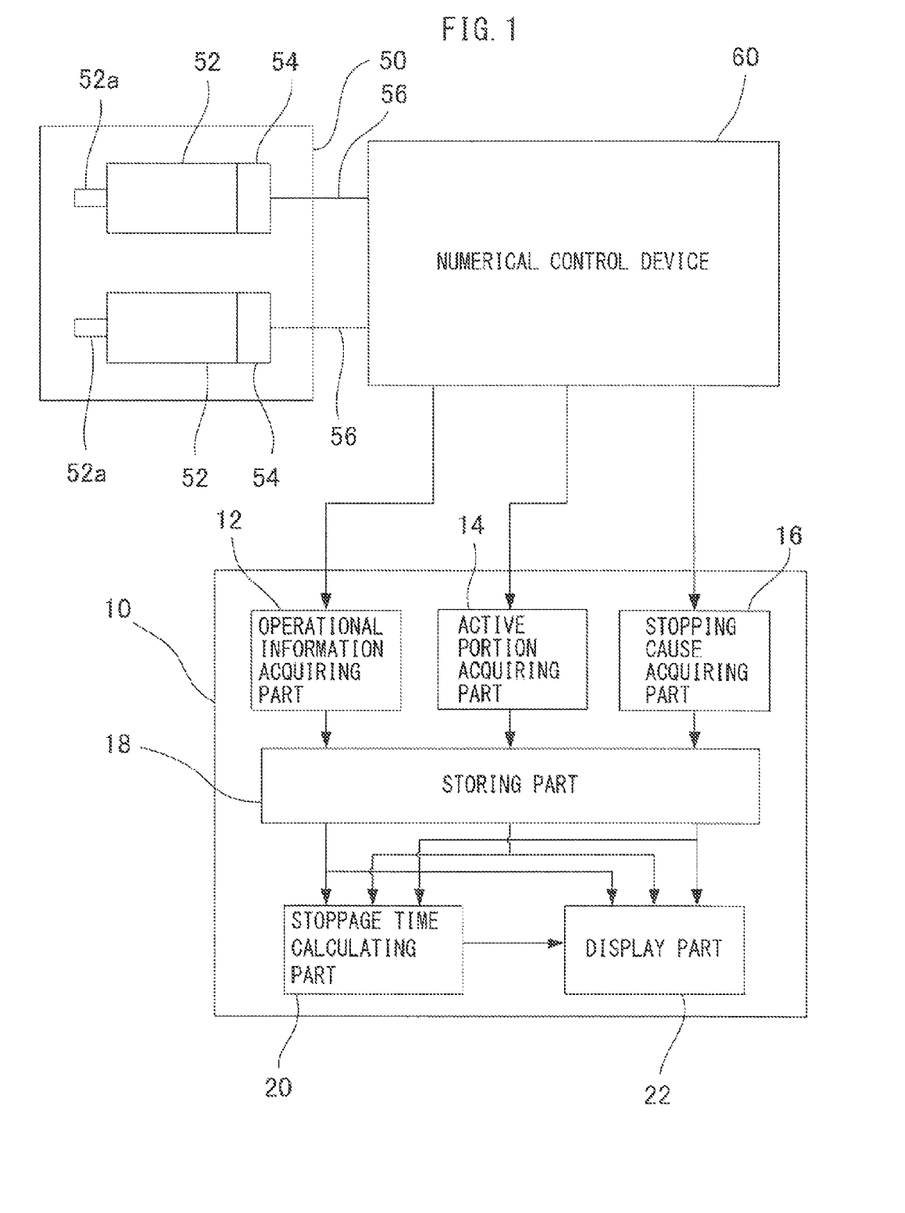
FIG. 1 schematically shows a configuration of a data acquisition device according to one embodiment of the present invention.

Embodiments of the present invention will be described below with reference to the accompanying drawings. FIG. 1 schematically shows a configuration of a data acquisition device 10 according to one embodiment of the present invention. In addition to the data acquisition device 10, a machine tool 50 having multiple drive axes, and a numerical control device 60 for controlling the machine tool 50 based on a predetermined machining program and machining condition are shown in FIG. 1.

The machine tool 50 is designed to perform a machining process as necessary by moving given tools of various types relative to a workpiece (not shown). The machine tool 50 includes one or more drive axis, e.g., two drive axes in the illustrated example, and a servo motor 52 for rotating each drive axis. The servo motors 52 are controlled by the numerical control device 60 in order to position the tool of the machine tool 50 in place relative to the workpiece. For example, the machine tool 50 may be a machining center which has feeding axes in an X-axis direction, a Y-axis direction and a Z-axis direction (spindle direction), respectively, which extend perpendicular to one another. A working table on which the workpiece is placed may be moveable relative to the tool of the machine tool 50. In this case, the servo motor 52 is coupled to drive axis serving as a feeding axis of the table.

Each servo motor 52 includes an output axis 52a for transmitting power to the drive axis of the machine tool 50, and an encoder 54 for detecting operational information of the servo motor 52, such as an angular position, velocity and torque of the servo motor 52. Between the output axis 52a of the servo motor 52 and the drive axis of the machine tool 50, there may be a speed reducer or a movement conversion mechanism for converting rotational movement to linear movement, as necessary.

The numerical control device 60 controls the servo motors 52, i.e., the drive axes of the machine tool 50, in accordance with a given machining program and machining condition. The numerical control device 60 may be integrally incorporated with the machine tool 50 or provided independently of the machine tool 50. The servo motors 52 of the machine tool 50 are connected to the numerical control device 60 via lines 56, so as to transmit to or receive from control signals, detection signals from the encoder 54 or the like. The configuration and function of the numerical control device 60 are well known, and therefore a detailed explanation will be omitted herein.

As shown in FIG. 1, the data acquisition device 10 includes an operational information acquiring part 12, an active portion acquiring part 14, a stopping cause acquiring part 16, a storing part 18, a stoppage time calculating part 20, and a display part 22. The data acquisition device 10 has a hardware configuration with known elements combined together, so as to carry out the processes described below. For example, the data acquisition device 10 may include ROM for storing a control program, CPU for executing various calculations in accordance with the control program, RAM for temporarily storing the result of calculations, an input device such as a keyboard and mouse, and a display device such as LCD, but the configuration is not limited thereto.

The operational information acquiring part 12 acquires data including operational information of the drive axis, hereinafter referred to as "the operational data," such as command data and detection data of a position, velocity and torque of the drive axis, from the numerical control device 60 with a predetermined sampling cycle, e.g., with a cycle of $\Delta t$. The detection data in the operational data are acquired by the encoder 54 provided for the servo motor 52. The operational data acquired by the operational information acquiring part 12 are successively stored by the storing part 18. The operational information acquiring part 12 also acquires the time of acquiring the operational data together with the operational data. Therefore, the storing part 18 stores the operational data associated with the time of acquisition thereof.

The active portion acquiring part 14 acquires the active portion of the machining program (hereinafter referred to as "the active portion") from the numerical control device 60 with a predetermined sampling cycle, e.g., with a cycle of $\Delta t$. The active portion may be information which allows for identifying which process is in progress among a series of processes of the machining program for carrying out a machining process. For example, the active portion may include, but is not limited to, a block number, program number, G-code or M-code of the machining program. The active portion acquired by the active portion acquiring part 14 is successively stored by the storing part 18. The active portion acquiring part 14 acquires the time of acquiring the active portion together with the active portion. Therefore, the storing part 18 stores the active portion associated with the time of acquisition thereof.

The stopping cause acquiring part 16 acquires information including the cause of stoppage when the drive axis of the machine tool 50 is stopped (hereinafter referred to as "stopping cause information") from the numerical control device 60 with a predetermined sampling cycle, e.g., with a cycle of $\Delta t$. "The drive axis being stopped" means a state in which the move command to each drive axis corresponding to the feeding axis of the machine tool 50 becomes zero, or in other words, all of the drive axes are stopped.

For example, the cause of stoppage of the drive axis may include, but is not limited to, (1) waiting time until the spindle of the machining center reaches a predetermined velocity, (2) waiting time until it is confirmed that positioning of the drive axis in response to a position command is completed, and (3) waiting time until it is confirmed that an auxiliary process carried out in accordance with M-code is completed. The stopping cause acquiring part 16 can acquire the stopping cause information regarding whether or not each cause of stoppage occurs.

The stopping cause information acquired by the stopping cause acquiring part 16 is successively stored by the storing part 18. The stopping cause information acquiring part 16 acquires the time of acquiring the stopping cause information together with the stopping cause information. Accordingly, the storing part 18 stores the stopping cause associated with the time of acquisition thereof.

As described above, the storing part 18 stores the operational data, the active portion and the stopping cause information output from the operational information acquiring part 12, the active portion acquiring part 14, the stopping cause acquiring part 16, respectively. The operational data, the active portion and the stopping cause information stored by the storing part 18 can be read out by the stoppage time calculating part 20 and the display part 22, as necessary.

The stoppage time calculating part 20 calculates the stoppage time for each cause of stoppage, based on the stopping cause information and the operational data, as well as the stoppage time for each active portion, based on the stopping cause information, the operational data and the active portion.

The display part 22 displays required information on a display device, which is not shown, in response to operation by an operator. The display part 22 provides the operator with visual information through the display device.

Figure 2:
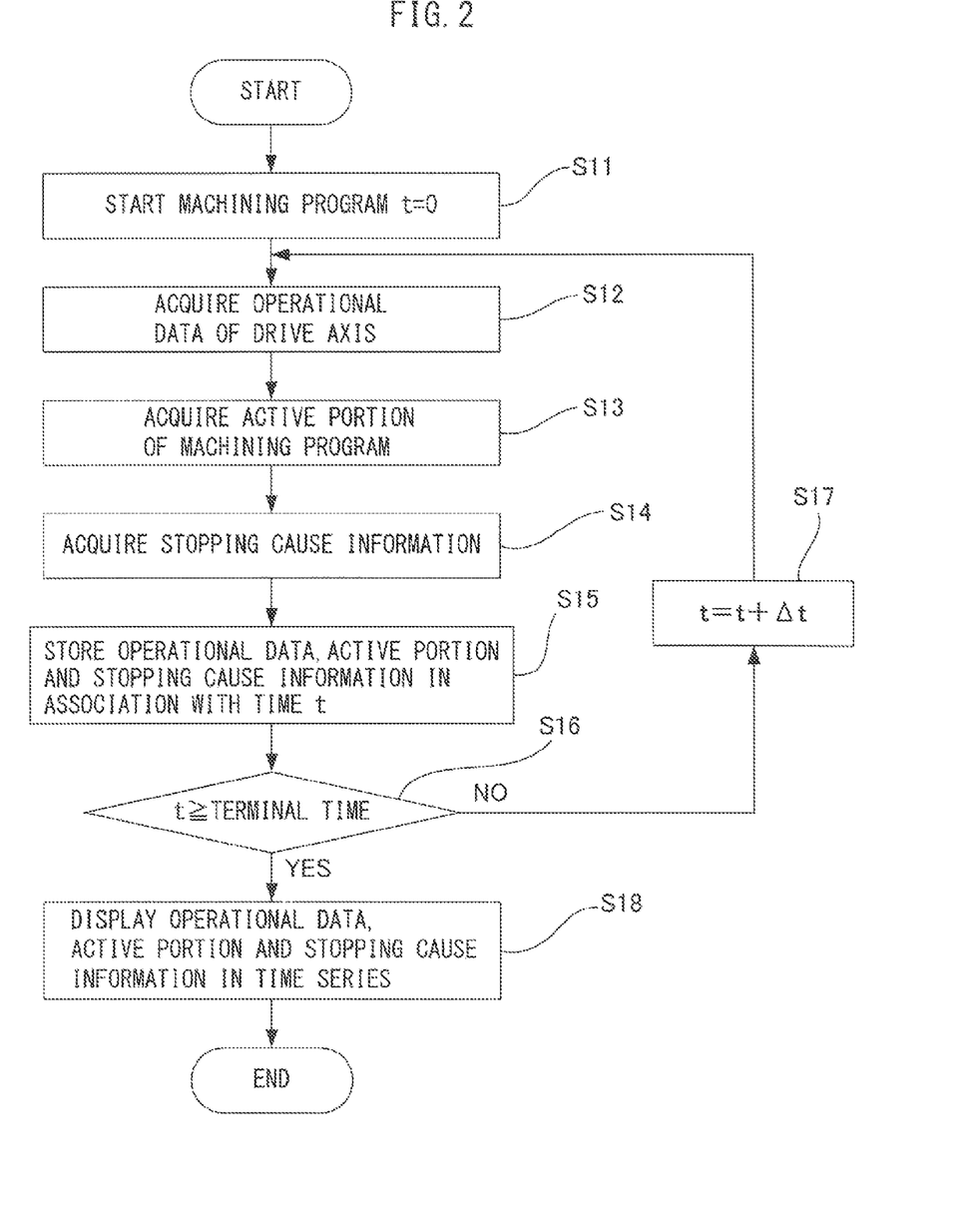
FIG. 2 is a flowchart showing a process carried out by the data acquisition device according to one embodiment.

Referring to FIG. 2, the flow of processes carried out by the data acquisition device 10. FIG. 2 is a flowchart showing processes carried out by the data acquisition device 10 in accordance with a first embodiment. According to the present embodiment, the display part 22 of the data acquisition device 10 displays the operational data, the active portion, and the stopping cause information in time series so as to be compared with one another.

On commencement of the machining program, zero is given to time t as an initial value (step S11).

The operational information acquiring part 12 acquires operational data of drive axes of the machine tool 50 at time t from the numerical control device 60 (step S12). In the present embodiment, move commands given to the drive axes by the numerical control device 60 with respect to X-axis direction and Y-axis direction are acquired as the operational data.

The active portion acquiring part 14 acquires an active portion of the machining program at time t from the numerical control device 60 (step S13). In the present embodiment, the block number of the machining program being carried out by the numerical control device 60 is acquired.

Further, the stopping cause acquiring part 16 acquires stopping cause information at time t (step S14). The stopping cause acquiring part 16 acquires the stopping cause information in a way that the causes of stoppage under consideration can be distinguished from one another, and outputs a value of "1" when a cause of stoppage is attributable to the stoppage time, while outputting a value of "0" when it is not.

In the present embodiment, the causes of stop under consideration are (1) waiting time from the commencement of the machining program up to time when the numerical control device 60 receives a spindle speed arrival signal (SAR signal), (2) waiting time from time when the move command to each drive shaft becomes zero up to time when the numerical control device 60 receives a positioning completion signal (INPOS signal) with respect to each drive shaft, and (3) waiting time required to confirm that in the state where the move command to each drive shaft is zero, an auxiliary process carried out in accordance with M-code is completed, or in other words, waiting time until the numerical control device 60 receives an auxiliary process completion signal (FIN signal), which means the auxiliary process is completed.

In other words, according to the present embodiment, the stopping cause acquiring part 16 acquires the stopping cause information corresponding to a first cause of stoppage due to "waiting for SAR signal," a second cause of stoppage due to "in-position check," and a third cause of stoppage due to "waiting for FIN signal," respectively, in a way that can distinguish them from one another.

For example, when acquiring the first stopping cause information, the stopping cause acquiring part 16 determines whether or not SAR signal is received at time t based on the information acquired from the numerical control device 60. After the commencement of the machining program and when the SAR signal has yet to be received, the stopping cause acquiring part 16 outputs an output value of "1," which means that the first cause of stoppage due to "waiting for SAR signal" is attributable to the stoppage time.

When acquiring the second stopping cause information, the stopping cause acquiring part 16 determines whether or not INPOS signal is received with respect to each drive axis at time t, based on the information acquired from the numerical control device 60. When the move command to each drive axis is zero and INPOS signal has yet to be received, the stopping cause acquiring part 16 outputs an output value of "1," which means that the second cause of stoppage due to "in-position check" is attributable to the stoppage time. "In-position check" is carried out in order to confirm whether or not the servo motor 52 reaches a command position. Specifically, "in-position check" can be carried out by determining whether or not the position deviation is within a range of in-position after the move command becomes zero.

When acquiring the third cause of stoppage, the stopping cause acquiring part 16 determines whether or not FIN signal is received, based on the information acquired from the numerical control device 60. Receipt of FIN signal means that the auxiliary process carried out in accordance with M-code is completed. The stopping cause acquiring part 16 outputs an output value of "1," which means the third cause of stoppage due to "waiting for FIN" is attributable to the stoppage time, when the move command to each drive axis is zero, M-code is running, and FIN signal has yet to be received.

Returning to FIG. 2, the operational data, the active portion and the stopping cause information acquired at steps S12 to S14 are stored by the storing part 18 in association with the respective time of acquisition t (step S15).

Then, it is determined whether or not time t has reached a terminal time, which means the end of the sampling period (step S16). If it is determined at step S16 that it has not reached the terminal time, the process proceeds to step S17, where "Δt" is added to the current time of t. Then, steps S12 to S15 are carried out again.

If it is determined at step S16 that time t has reached the terminal time, the process proceeds to step S18, where the display part 22 displays the operational data, the active portion and the stopping cause information in time series so as to be compared with one another.

Figure 3:
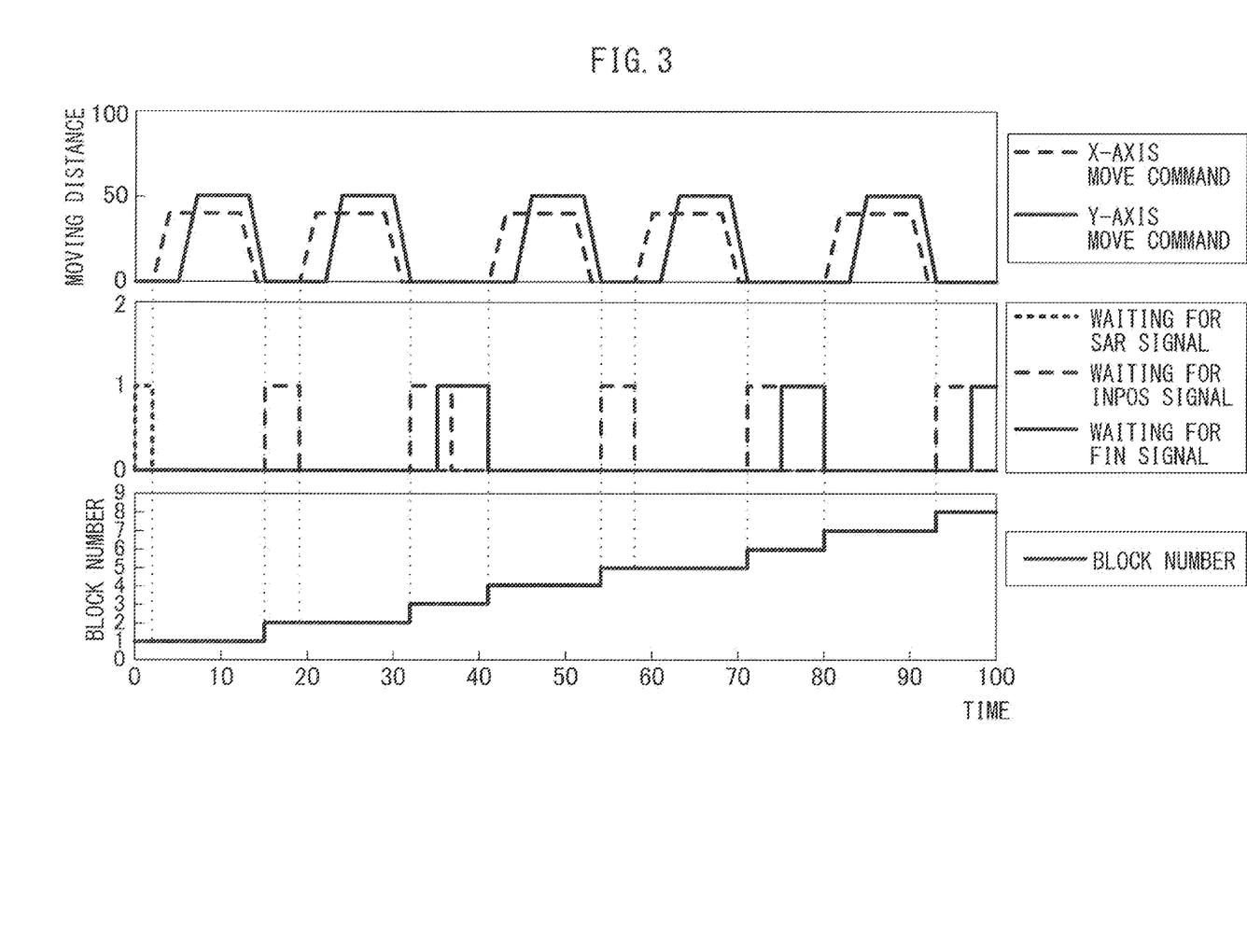
FIG. 3 shows an exemplary display of time series data displayed in accordance with the process carried out by the data acquisition device described with reference to FIG. 2.

FIG. 3 shows an exemplary display of time series data displayed by the display part 22 at step S18. The upper part of the graph shows the move command with respect to X-axis direction by dashed line, and the move command with respect to Y-axis direction by solid line, respectively. The middle part of the graph shows the timing at which the cause of stoppage occurs. The dotted line represents the cause of stoppage due to "waiting for SAR signal," the dashed line represents the cause of stoppage due to "in-position check," and the solid line represents the cause of stoppage due to "waiting for FIN signal." The lower part of the graph shows the block numbers of the program: block numbers 1 to 9. The horizontal axis of each graph represents elapsed time from the commencement of the machining program. The elapsed time in the horizontal axis may be actual elapsed time or expressed as a relative value by defining the terminal time of the sampling period as 100.

As shown in FIG. 3, the move commands to the drive axes, the causes of stoppage and the block numbers of the machining program are displayed so as to be compared with one another. This allows an operator to easily ascertain information, such as the stoppage time of the drive axes, the causes of stoppage, and at which stage of the machining program the drive axes are stopped. In addition, since the block numbers of the machining program are shown in time series, the operator can easily identify the active portion of the machining program when the drive axes are in a stopped state. Based on the displayed information as shown in FIG. 3, the operator can modify the machining program or parameters as necessary, so as to reduce the stoppage time of the drive axes.

Figure 4:
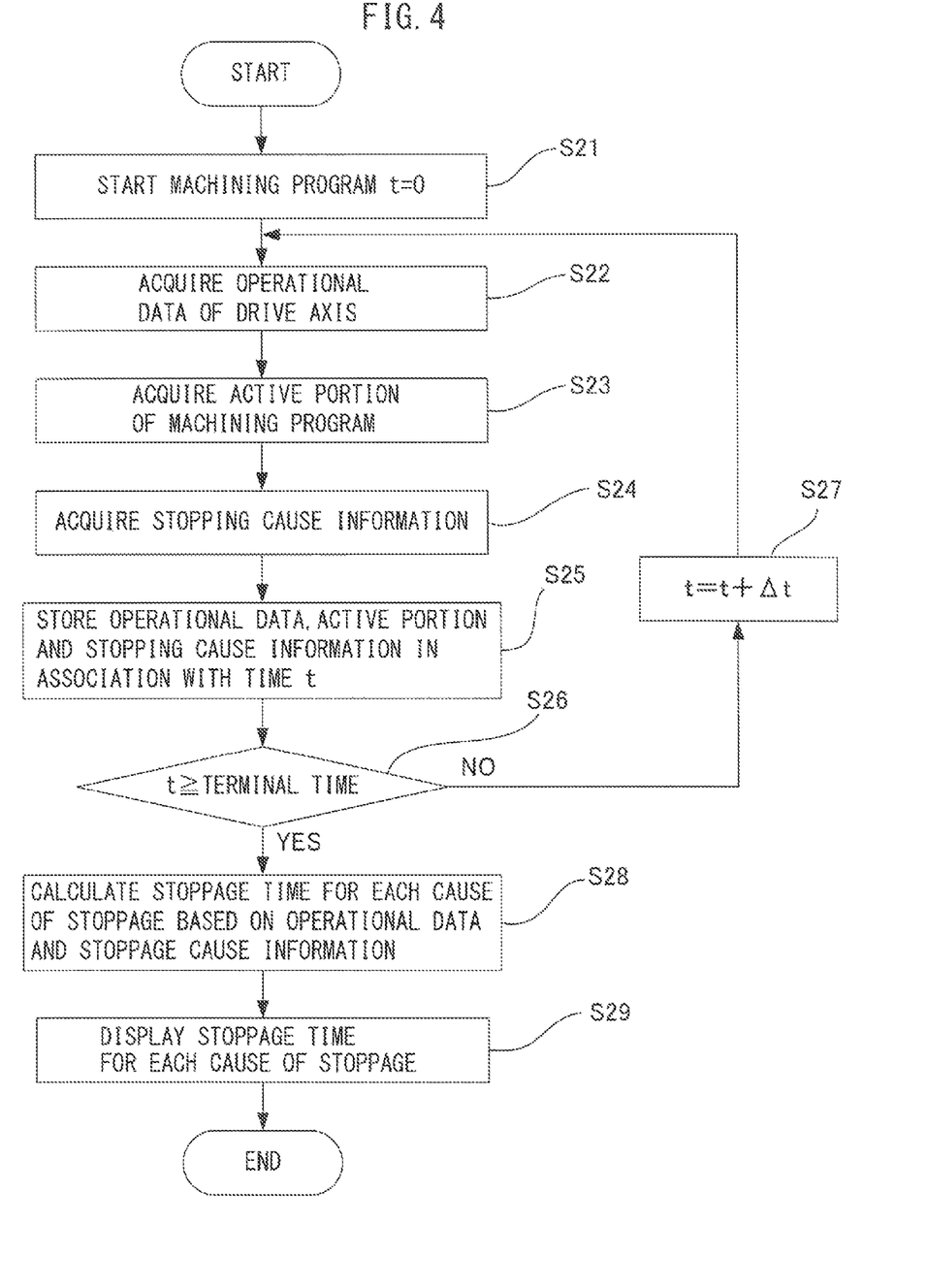
FIG. 4 is a flowchart showing a process carried out by the data acquisition device according to one embodiment.

FIG. 4 is a flowchart showing a process carried out by the data acquisition device 10 according to a second embodiment of the present invention. In this embodiment, the display part 22 of the data acquisition device 10 displays total stoppage time for each cause of stoppage. The processes at steps S21 to S27 in FIG. 4 are carried out in the same way as steps S11 to S17 described above with reference to FIG. 2, and therefore explanation thereon will be omitted.

According to this embodiment, the stoppage time calculating part 20 of the data acquisition device 10 calculates the stoppage time for each cause of stoppage at step S28, based on the operational data acquired at step S22 and on the stopping cause information acquired at step S24.

Then, the display part 22 displays the stoppage time for each cause of stoppage calculated at step S28 on the display device (step S29).

Figure 5:
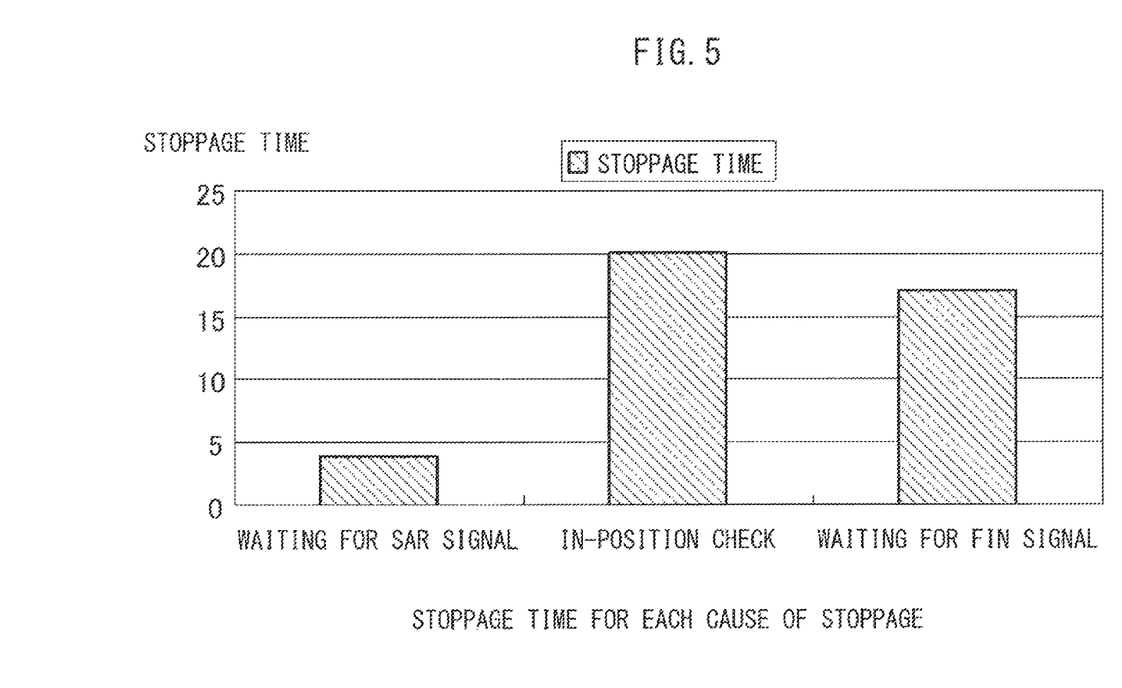
FIG. 5 shows an exemplary display of stoppage time for each cause of stoppage displayed in accordance with the process carried out by the data acquisition device described with reference to FIG. 4.

FIG. 5 is an exemplary display of the stoppage time for each cause of stoppage displayed by the display part 22 at step S29. As is apparent in FIG. 5, in this example, the stoppage time by the cause of stoppage due to "in-position check" is the longest among three causes of stoppage under consideration. Based on this information, an operator can reduce time required to confirm completion of positioning of the drive axes, for example, by increasing an in-position range. As a result, the machining program can proceed to a next command in a shorter period of time, thereby reducing the stoppage time of the drive axes.

Figure 6:
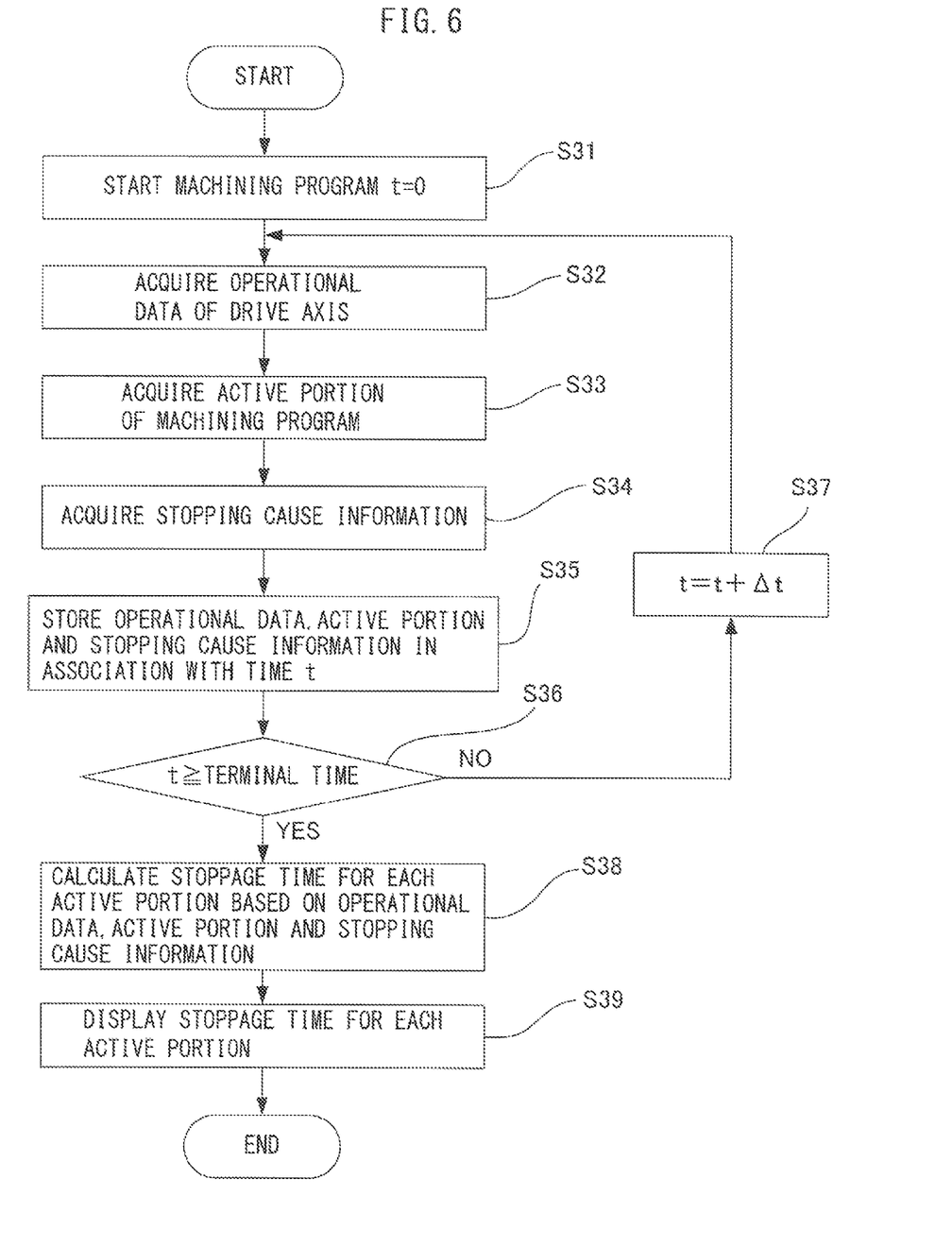
FIG. 6 is a flowchart showing a process carried out by the data acquisition device in accordance with one embodiment.

FIG. 6 is a flowchart showing a process carried out by the data acquisition device 10 according to a third embodiment. In this embodiment, the display part 22 of the data acquisition device 10 displays total stoppage time for each active portion. The processes at steps S31 to S37 in FIG. 6 are carried out in the same way as steps S11 to S17 described above with reference to FIG. 2, and therefore explanation thereon will be omitted.

According to this embodiment, the stoppage time calculating part 20 of the data acquisition device 10 calculates the stoppage time for each active portion at step S38, based on the operational data acquired at step S32, the active portion of the machining program acquired at step S33, and the stopping cause information acquired at step S34.

Then, the display part 22 displays the stoppage time for each active portion calculated at step S38 on the display device (step S39).

Figure 7:
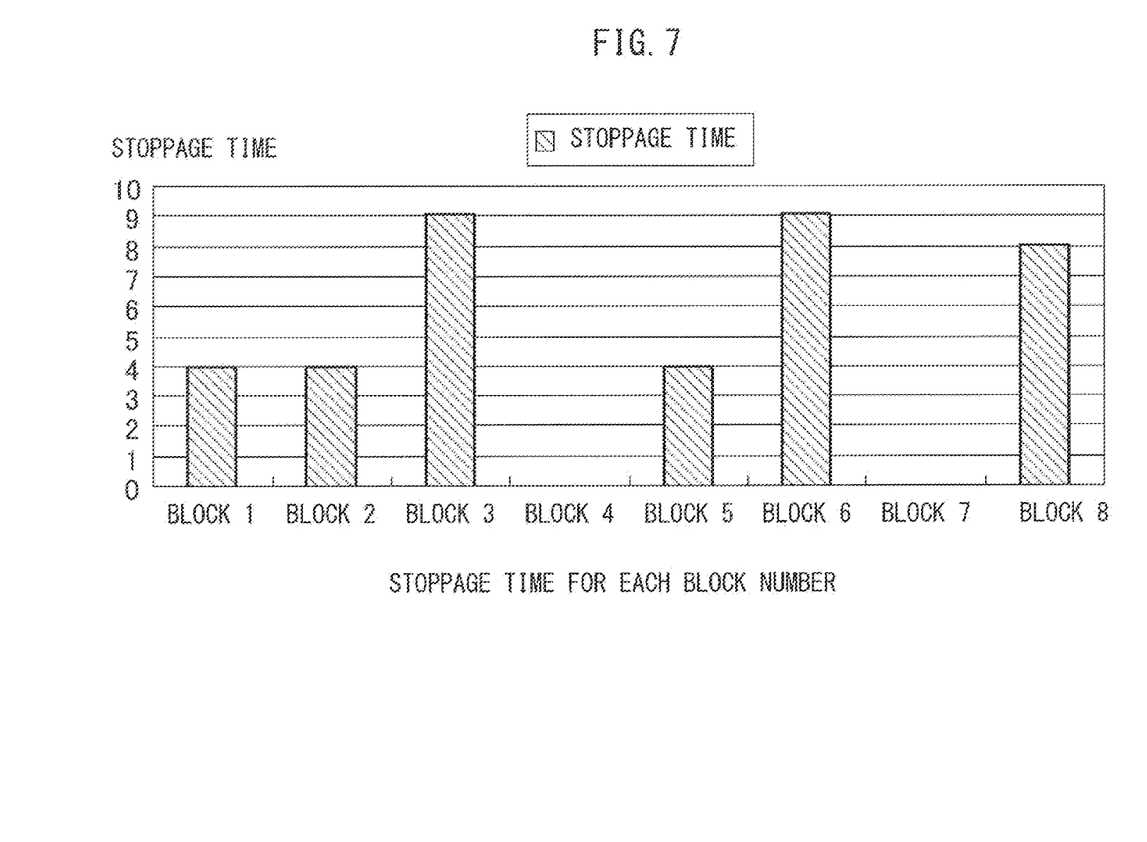
FIG. 7 shows an exemplary display of stoppage time for each block number of the program displayed in accordance with the process carried out by the data acquisition device described with reference to FIG. 6.

FIG. 7 is an exemplary display of the stoppage time for each active portion displayed by the display part 22 at step S39. As is apparent from FIG. 7, the stoppage time is the longest during processes at blocks 3 and 6. Based on this information, an operator can reduce the stoppage time by modifying a portion of the machining program corresponding to blocks 3 and 6 as necessary. Accordingly, the cycle time required to complete the machining process can be reduced.

In the illustrated examples, the stoppage time for each cause of stoppage and the stoppage time for each active portion are shown in the form of bar chart, respectively. However, any other known type of chart, such as line chart or pie chart, or alternatively a table may be adopted as well. The operational data, the stopping cause information and the active portion may be displayed in time series in any other known way, for example, in the form of a table, provided that they can be compared with one another.

EFFECT OF THE INVENTION

According to the data acquisition device configured as described above, the data including the operational information of the drive axes, the active portion of the program and the cause of stoppage are acquired in association with the time of acquisition, respectively. This allows an operator to easily identify the cause of stoppage of the drive axis by comparing the respective information associated with one another in time series. Since the active portion of the program is successively acquired over time, the active portion of the program can be easily identified when the drive axes are in a stopped state.

According to the data acquisition device including a stoppage time calculating part for calculating stoppage time for each cause of stoppage or for each active portion of the machining program, an operator can easily identify the cause of stoppage or the active portion which results in stopping the drive axes.

The data acquisition device according to the present invention acquires useful information for reducing the stoppage time of the drive axes and provides an operator with such information. Based on the information provided, the operator can efficiently reduce the stoppage time by adjusting the machining program or parameters. As a result, the cycle time can be efficiently reduced.

Although various embodiments and modifications of the present invention have been described, it is apparent for those skilled in the art that other embodiments and modifications can also realize the intended effects and advantages of the invention. In particular, it is possible to omit or replace the constituent elements of the embodiments and modifications described herein, or add a known means thereto, without departing from the scope of the invention. It is also apparent for those skilled in the art that the invention can be implemented by any combination of the features of the embodiments explicitly or implicitly disclosed herein.

What is claimed is:

1. A data acquisition device for acquiring, from a numerical control device of a machine tool for controlling a drive axis in accordance with a machining program and a machining condition, data including operational data representative of operational information of the drive axis, the data acquisition device comprising:
an operational information acquiring part for acquiring the operational data from the numerical control device;
an active portion acquiring part for acquiring an active portion of the machining program from the numerical control device;
a stopping cause acquiring part for acquiring, from the numerical control device, stopping cause information representative of cause of stoppage when the drive axis is stopped; and
a storing part for storing the operational data, the active portion, and the stopping cause information, together with time of acquisition thereof, respectively.

2. The data acquisition device according to claim 1, wherein the operational data includes a move command to the drive axis.

3. The data acquisition device according to claim 1, further comprising a display part for displaying the operational data, the active portion, and the stopping cause information in time series in the form of graph or table such that the operational data, the active portion, and the stopping cause information can be compared with one another.

4. The data acquisition device according to claim 1, further comprising:
- a stoppage time calculating part for calculating stoppage time for each cause of stoppage, based on the stopping cause information and the operational data; and
- a stoppage time display part for displaying the stoppage time for each cause of stoppage in the form of graph or table.

5. The data acquisition device according to claim 1, further comprising:
- a stoppage time calculating part for calculating stoppage time for each active portion, based on the stopping cause information, the operational data and the active portion; and
- a stoppage time display part for displaying the stoppage time for each active portion in the form of graph or table.

\* \* \* \* \*